United States Patent
Hummelshøj

(10) Patent No.: US 10,411,317 B2
(45) Date of Patent: Sep. 10, 2019

(54) METAL-AIR BATTERY INCLUDING PASSIVATION LAYER FORMED ON METAL ANODE

(71) Applicant: Toyota Research Institute, Inc., Los Altos, CA (US)

(72) Inventor: Jens Strabo Hummelshøj, Burlingame, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 57 days.

(21) Appl. No.: 15/637,151

(22) Filed: Jun. 29, 2017

(65) Prior Publication Data

US 2019/0006726 A1    Jan. 3, 2019

(51) Int. Cl.
| | |
|---|---|
| H01M 12/06 | (2006.01) |
| H01M 4/583 | (2010.01) |
| H01M 4/88 | (2006.01) |
| H01M 4/38 | (2006.01) |

(52) U.S. Cl.
CPC ........... *H01M 12/06* (2013.01); *H01M 4/583* (2013.01); *H01M 4/382* (2013.01); *H01M 4/8807* (2013.01)

(58) Field of Classification Search
CPC .............................. H01M 12/06; H01M 4/583
USPC ......................................... 429/402, 403, 405
See application file for complete search history.

(56) References Cited

U.S. PATENT DOCUMENTS

| | | | |
|---|---|---|---|
| 8,044,508 B2 | 10/2011 | Jenson et al. | |
| 2013/0171527 A1* | 7/2013 | Lanning | H01M 4/861 429/405 |
| 2013/0344403 A1* | 12/2013 | Albertus | H01M 12/08 429/407 |
| 2014/0017578 A1* | 1/2014 | Albertus | H01M 4/86 429/405 |
| 2014/0023940 A1* | 1/2014 | Zaghib | H01M 4/134 429/405 |
| 2014/0045079 A1* | 2/2014 | Kozinsky | H01M 4/8615 429/405 |
| 2014/0087273 A1* | 3/2014 | Christensen | H01M 12/02 429/406 |
| 2016/0064787 A1* | 3/2016 | Koido | H01M 4/8626 429/405 |

(Continued)

FOREIGN PATENT DOCUMENTS

KR    101561605 A    6/2015

OTHER PUBLICATIONS

Wikipedia contributors. "Passivation (chemistry)." Wikipedia, The Free Encyclopedia. Wikipedia, The Free Encyclopedia, Dec. 3, 2018. Web. Feb. 4, 2019. (Year: 2018).*

(Continued)

*Primary Examiner* — Sean P Cullen
(74) *Attorney, Agent, or Firm* — Christopher G. Darrow; Darrow Mustafa PC

(57) ABSTRACT

A metal-air battery includes an anode and a passivation layer formed on the anode. The passivation layer functions as electrolyte and cathode, so that no additional electrolyte or cathode is included. During discharge, metal cations derived from oxidation of the anode migrate across the passivation layer, and react with nucleophilic gas and electrons received from a gas diffusion layer. The metal-air battery, by virtue of having no added electrolyte or cathode, is compact and contains no volatile materials.

20 Claims, 4 Drawing Sheets

(56) References Cited

U.S. PATENT DOCUMENTS

2017/0170529 A1\* 6/2017 Kemmer ............ H01M 10/445

OTHER PUBLICATIONS

"Passivate." Wiktionary, The Free Dictionary. Nov. 9, 2017, 20:07 UTC. Feb. 4, 2019, 18:18 <https://en.wiktionary.org/w/index.php?title=passivate&oldid=47992609>. (Year: 2017).\*

Zhao et al., Exploring Metal-air Chemistries with a New Solid Oxide Metal-Air Redox Battery, ECS Trans., 58 (12), p. 67-74, (2014).

Otaegui et al., Performance and long term stability of a liquid-tin anode metal-air solid electrolyte battery prototype, Electrochim. Acta., 214, pp. 192-200 (2016.

\* cited by examiner

METAL-AIR BATTERY INCLUDING PASSIVATION LAYER FORMED ON METAL ANODE

TECHNICAL FIELD

The present disclosure generally relates to voltaic cells and, more particularly, to metal-air batteries.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

State of the art metal-air batteries typically require liquid or gel electrolytes to conduct cations from an anode to a cathode. As such, a cathode, for storage of oxidized active material, and that is spatially separated from both the anode and the electrolyte, is also typically required. These requirements add to the volume and weight of a metal-air battery, and often mandate the inclusion of volatile materials.

In many applications, including, but not limited to, automotive and personal electronics, it is very desirable to minimize battery weight and volume, including the weight and volume of metal-air batteries. Accordingly, it would be desirable to provide an improved design for metal-air batteries that have the potential to decrease battery size and remove the requirement for volatile components.

SUMMARY

This section provides a general summary of the disclosure, and is not a comprehensive disclosure of its full scope or all of its features.

In various aspects, the present teachings provide a metal-air battery. The metal-air battery includes a metal anode and a passivation layer formed on the metal anode. The passivation layer defines a reaction surface. The metal-air battery also includes an external conductor in electric communication with the metal anode. A gas diffusion layer contacts the passivation layer. The gas diffusion layer has a portion that is open to an external gas source, and a porous conductor in electric communication with the external conductor and contacting the reaction surface. During discharge, the metal anode undergoes oxidation such that cations of the metal are conducted through the passivation layer to the reaction surface, reacting with nucleophilic gas received from the external gas source, and with electrons received from the porous conductor, producing metal-gas adduct that is incorporated to the passivation layer.

In other aspects, the present teachings provide a method of operating a metal-air battery. The method includes a step of oxidizing metal atoms in a metal anode to produce metal cations and electrons. The method further includes a step of conducting the metal cations to a reaction surface of a passivation layer, the passivation layer formed of a metal-gas adduct on a surface of the metal anode. The method further includes steps of conducting the electrons through an external conductor to the reaction surface; and diffusing nucleophilic gas through a gas diffusion layer to the reaction surface. The method also includes a step of reacting the metal cations with the electrons and the oxygen gas at the reaction surface to produce the oxide of the metal and thereby increase size of the passivation layer.

In still other aspects, the present teachings provide a lithium-air battery free of volatile components. The battery includes a lithium anode and a passivation layer of an oxide of lithium formed on the lithium anode. The passivation defines a reaction surface and changes in size based on charge and discharge activity of the lithium-air battery. The battery further includes a gas diffusion layer comprising a porous conductor contacting the reaction surface and an interface region defining a boundary between the lithium anode and the passivation layer. The battery further includes an external conductor in electric communication with the lithium anode and the porous conductor and a monitoring device configured to detect a presence of voids adjacent the interface region. The battery also includes a porous heating element disposed adjacent the interface region and configured to selectively heat the interface region and thereby eliminate the voids.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide solid-state metal-air batteries that require no separate electrolyte and cathode. Metal-air batteries according to the present teachings are thus very compact and include no volatile components.

Metal-air batteries according to the present teachings have a metal anode with a passivation layer formed thereon that progressively increases in size during battery discharge. The passivation layer functions as a battery electrolyte, conducting oxidized metal cations derived from the metal anode so that they can react with oxygen and with electrons derived from the metal anode. The passivation further functions as a cathode, storing the metal cations so reacted, resulting in the aforementioned size increase of the passivation layer.

Figure 1:
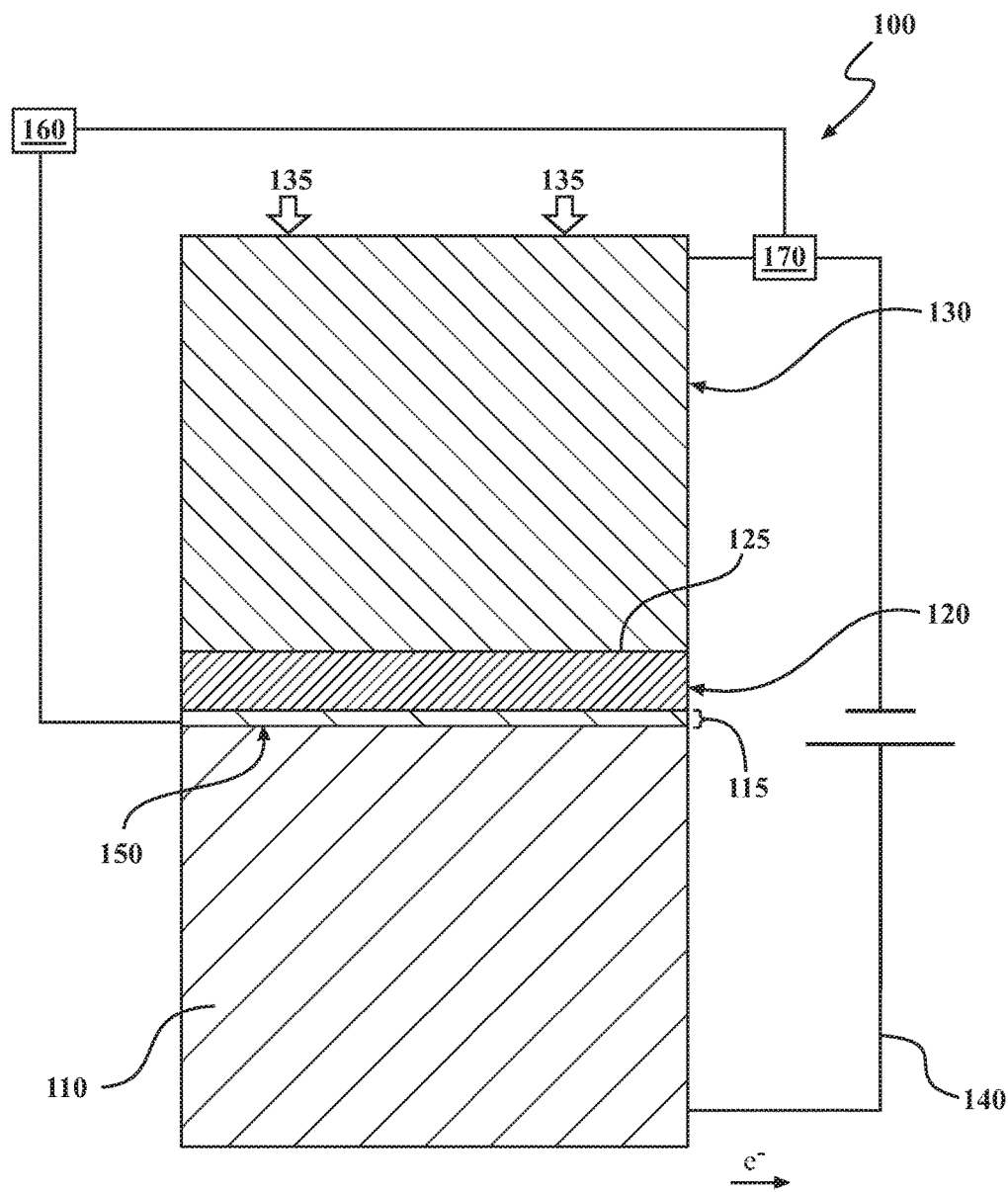
FIG. 1 is a schematic view of a metal-air battery of the present disclosure when substantially charged.
Figure 2:
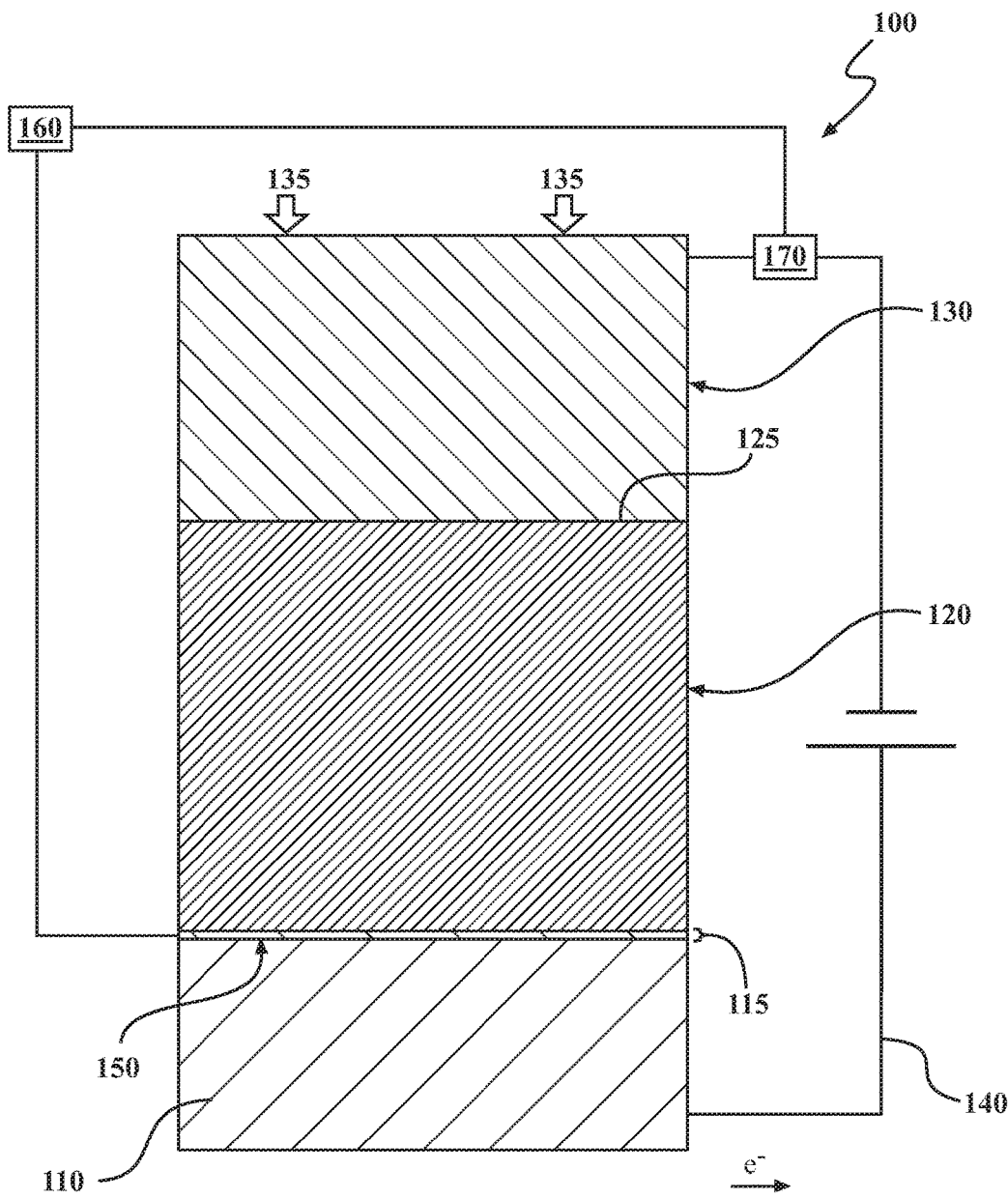
FIG. 2 is a schematic view of a metal-air battery of the present disclosure when substantially discharged.

FIGS. 1 and 2 are schematic illustrations of a metal-air battery 100 according to the present teachings. FIG. 1 shows the metal-air battery 100 at an early stage of discharge (i.e. the battery is substantially charged), and FIG. 2 shows the metal-air battery 100 at a later stage of discharge (i.e. the battery is incompletely, but substantially, discharged). The metal-air battery 100 includes a metal anode 110. The metal anode 110 can be composed partly or entirely of any metal or metalloid that is suitable as an active material in a primary (i.e. non-rechargeable) or secondary (i.e. rechargeable) voltaic cell. Suitable examples include, without limitation, lithium, sodium, potassium, magnesium, aluminum, germanium, calcium, iron, silicon, tin, and zinc. The metal anode can be composed of the pure active material metal, an alloy of the active material metal, or a structural component, such as graphite, that is impregnated with the active metal when at least partially charged. In some specific implementations, the metal anode will include lithium metal.

A passivation layer 120 is formed on a surface of the metal anode 110. The passivation layer 120 will generally be composed of one or more gas adducts of the active metal that is contained in the metal anode 110. The phrase "gas adduct" as used herein can include oxides, carbonates, nitrides, nitrates, nitrates, sulfites, sulfates, or any other gas adduct. In many implementations, the passivation layer will be composed substantially of one or more oxides of the active metal contained in the metal anode 110, formed by Reaction I:

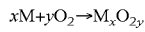  I, where M is the active metal contained in the metal anode 110. In certain specific variations, the active metal, M, will be lithium, and the gas adduct of which the passivation layer is substantially formed will be one or more oxides of lithium, such as lithium oxide ($Li_2O$), lithium superoxide ($LiO_2$), and lithium peroxide ($Li_2O_2$).

An interface region 115 defines the boundary between the metal anode 110 and the passivation layer 120. The interface region is a boundary of finite thickness, in which the reduced metal of the metal anode 110 (e.g. $Li^0$, lithium metal) and the gas adduct of the passivation layer 120 (e.g. $Li_2O_2$) are present in at least partial admixture.

As will be made apparent, it is desirable that the passivation layer be ionically conductive and electrically insulative. Thus, active metals capable of forming oxides, or other gas adducts, that are substantially ionically conductive and electrically insulative will be most suitable for use with the present metal-air battery 100 design.

The metal-air battery 100 further includes a gas diffusion layer 130, contacting the passivation layer 120. The gas diffusion layer has a portion that is open to an external gas source, defining a gas inlet 135, and is configured to admit nucleophilic gas to the interior of the metal-air battery 100. In many implementations, the nucleophilic gas will be oxygen, either in purified form or impure form, such as in air. In some implementations, different nucleophilic gases can be used, such as carbon dioxide or nitrogen, or various components of an exhaust gas such as carbon monoxide, nitric oxide, or nitrogen dioxide. It will be understood that the composition of the passivation layer will be substantially dictated by the nucleophilic gas that is employed, in combination with the identity of the active metal of the metal anode 110.

The gas diffusion layer 130 includes a porous conductor that contacts a reaction surface 125 of the passivation layer 120. The porous conductor is configured to conduct electrons to the reaction surface 125, and also to be permeable to nucleophilic gas so that nucleophilic gas can diffuse to the reaction surface 125.

The porous conductor can be any electrically conductive material having a high surface area. In various implementations, the porous conductor can have a surface area of at least: 100 $m^2/g$, or 200 $m^2/g$, or 300 $m^2/g$, or 400 $m^2/g$, or 500 $m^2/g$, or 600 $m^2/g$, or 700 $m^2/g$, or 800 $m^2/g$, or 900 $m^2/g$, or 1000 $m^2/g$. In certain implementations, the porous conductor can include an array of carbon nanotubes.

The metal-air battery 100 can include an external conductor 140 that is in electric communication with the metal anode 110 and the porous conductor of the gas diffusion layer 130, thus placing the metal anode 110 and the porous conductor in electric communication with one another. The external conductor 140 can be any suitable electric conductor, such as a copper wire.

During discharge of the metal-air battery 100, atoms of the active metal, M, are oxidized to metal cations, $M^+$, according to Reaction II:

  II.

While the generic example of Reaction II shows an atom of the active metal oxidized to a monovalent cation, having a +1 charge, and a single electron, it will be appreciated that, depending on the identity of the active metal, a single oxidation event can produce a divalent or polyvalent cation and more than one electron. This will generally depend on the identity of the active metal contained in the metal anode 110. Because the passivation layer is ionically conductive, the oxidized metal cations, $M^+$, travel across the interface region 115, into and through the passivation layer 120, and ultimately to the reaction surface 125. Because the passivation layer is electrically insulative, electrons derived from metal oxidation according to Reaction II will not enter the passivation layer 120, but will instead exit the metal anode 110 to the external conductor 140. The external conductor 140 will conduct the electrons to the porous conductor of the gas diffusion layer 130, and ultimately to the reaction surface 125. Simultaneously, nucleophilic gas diffusing through pores of the porous conductor of the gas diffusion layer 130 arrives at the reaction surface 125, enabling conversion and storage of the oxidized metal in the passivation layer via Reaction III:

  III, noting that Reaction III is effectively the combination of Reactions I and II.

It will thus be understood that, during discharge of the metal-air battery 100, the passivation layer 120 functions as both electrolyte and cathode in the metal-air battery 100. Functioning as an electrolyte, the passivation layer 120 receives oxidized metal cations from the metal anode 110 and conducts the oxidized metal cations to the reaction surface 125 where they react with electrons and nucleophilic gas (e.g. oxygen) to form metal oxide redox product, the material of which the passivation layer is composed. Functioning as a cathode, the passivation layer 120 incorporates and stores the metal oxide redox product once it forms at the reaction surface.

Figure 3:
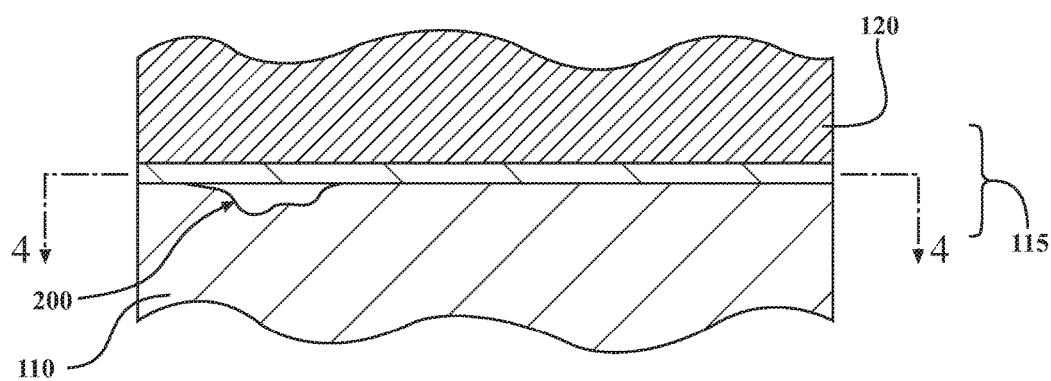
FIG. 3 is a schematic view of a portion of the metal-air battery of FIGS. 1 and 2, and centered on an interface region between a metal anode and a passivation layer.

As metal atoms in the anode are oxidized to form metal cations and leave the anode, the metal anode will decrease in mass and volume. Similarly, as metal cations enter the passivation layer, react with nucleophilic gas, and are incorporated as gas adduct, the passivation layer 120 will increase in mass and volume. With reference to FIG. 3, as the metal anode 110 and passivation layer 120 change in size, voids, such as void 200, may form at the interface. When such a void 200 forms, where contact is lost between the metal anode 110 and passivation layer 120, an undesirable increase in impedance across the cell, and consequently diminished current density, may occur.

Figure 4:
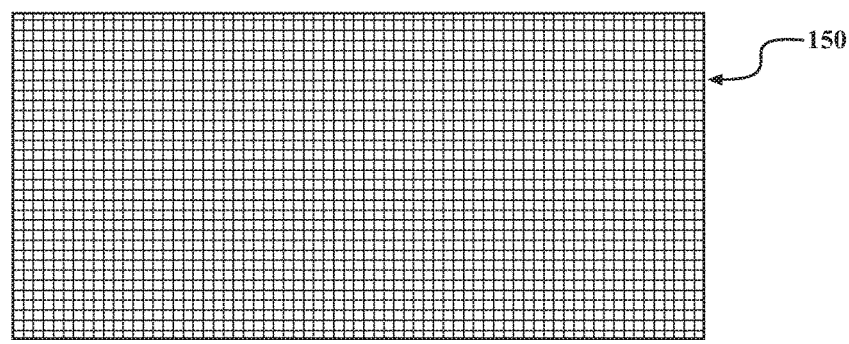
FIG. 4 is a cross-sectional view of FIG. 3, taken along the line 4-4.

To avoid such losses, the metal-air battery 100 optionally includes a heating element 150, positioned at the interface region 115 and configured to melt portions of the metal anode 110 and/or passivation layer 120 at the interface in order to eliminate such voids 200 and thereby maintain consistent current density. Referring to FIG. 4, showing a cross-sectional view of the partial cell of FIG. 3, the heating element 150 can have a mesh structure, or other porous two-dimensional structure, configured to provide uniform contact coverage within the interface region 115, while allowing metal cations to pass through. The heating element 150 can, in some implementations, produce heat through Joule heating, in which heat is a byproduct of electric resistance when an electric current is passed through the heating element 150. In such implementations, the heating element 150 can be composed substantially of semiconductor materials such as, but not limited to, alloys of NiCr, FeCrAl, or CuNi; ceramics such as $BaTiO_3$ or $PbTiO_3$; and intermetallic compounds such as $MoSi_2$.

When present, the heating element 150 can optionally receive power from the metal-air battery 100. Thus, and with reference again to FIGS. 1 and 2, the metal-air battery 100 can further include a controller 160 and at least one monitoring device, such as a sensor 170, configured to control activation of the heating element 150. The sensor 170 is configured detect a condition useful for triggering activation of the heating element 150. The controller 160, in communication with both the sensor 170 and the heating element 150, will activate the heating element when receiving data from the sensor to indicate that the condition useful for triggering activation of the heating element 150 has passed a threshold.

In one example, the sensor 170 can be an ammeter in communication with the external conductor 140. A current passing through the external conductor 140 can be selected as a minimum threshold during battery discharge, or some segment of battery discharge. If the ammeter detects that the current passing through the external conductor 140 has fallen below the minimum threshold, indicating suboptimal current density and thus the likelihood of voids 200 at the interface region 115, the controller 160 directs activation of the heating element 150, thereby melting portions of the metal anode 110 and/or passivation layer 120 at the interface and eliminating the voids 200. Once the sensor 170 detects that current passing through the external conductor 140 has risen above the minimum threshold, or above another desired threshold, the controller 160 directs deactivation of the heating element 150.

Figure 5A:
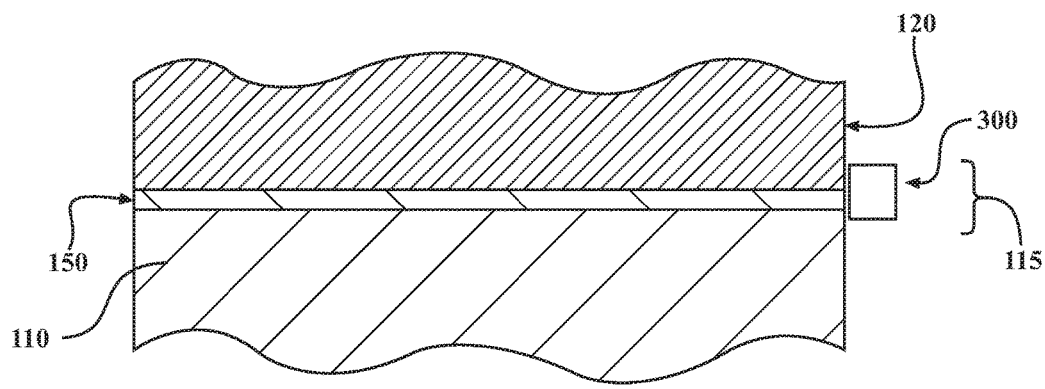
FIG. 5A is a schematic view of a portion of the metal-air battery of FIGS. 1 and 2, and centered on an interface region between a metal anode and a passivation layer at an early stage of discharge.
Figure 5B:
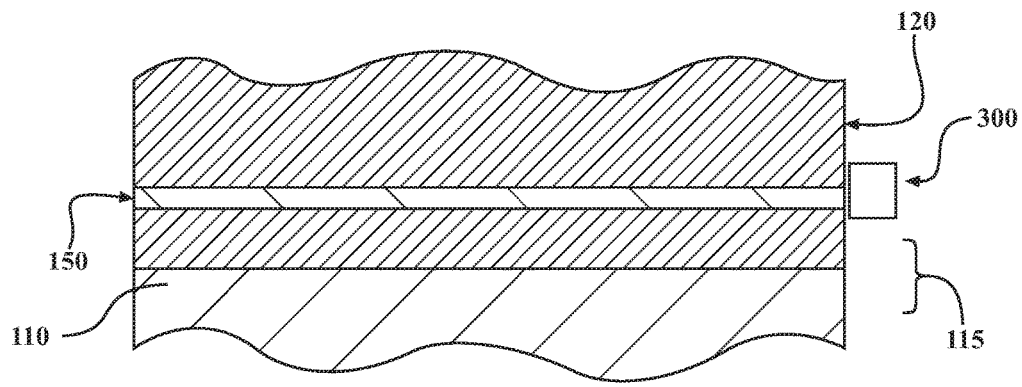
FIG. 5B is a schematic view of the portion of the metal-air battery of FIG. 4 at a later stage of discharge following movement of the interface region.
Figure 5C:
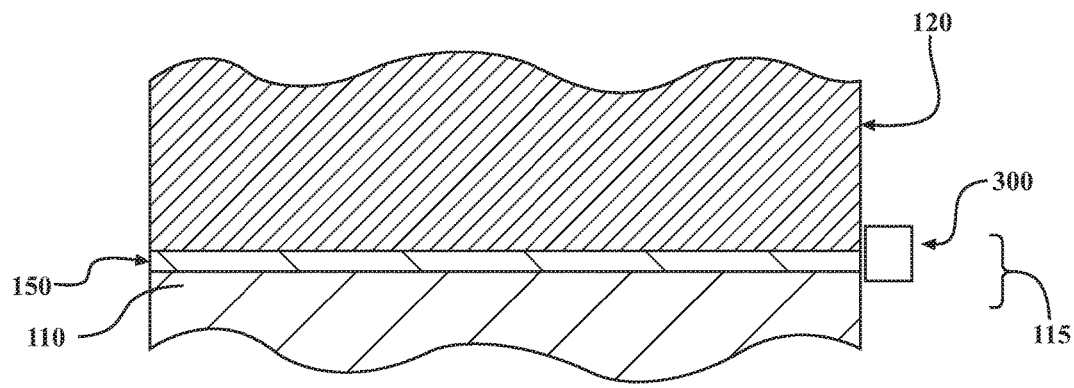
FIG. 5C is a schematic view of the portion of the metal-air battery of FIG. 4 at a later stage of discharge following movement of a heating element to place it within the interface region.

With continued reference to FIGS. 1 and 2, it is generally to be expected that, as gas-adduct is incorporated at the reaction surface 125 and the passivation layer 120 consequently increases in mass and volume, the reaction surface 125 will move toward the gas inlet 135. Thus, newly incorporated gas adduct grows into and around the porous conductor of the gas diffusion layer 130, causing the porous conductor to become increasingly impregnated in the passivation layer 120 during discharge. It is possible, however, that the interface region 115 may also move somewhat during discharge. FIGS. 5A-5C show schematic views of an area of the metal-air battery 100 around the interface region 115 at different stages of discharge, illustrating movement of the interface region 115. With continued reference to FIGS. 1 and 2, as well as reference to FIGS. 5A and 5B, in some instances, the position of the interface region 115 can change as the metal anode 110 decreases in mass and volume, and the passivation layer 120 increases in mass and volume, during cell discharge. For example, as shown in FIGS. 1 and 2, as well as FIGS. 5A and 5B showing close-up views of the area surrounding the interface region during earlier and later stages of discharge, respectively, the interface region 115 may move away from the gas inlet 135 during discharge.

It will be appreciated that, in instances in which the position of the interface region 115 changes during discharge, the heating element 150 will come out of position, as shown in FIG. 5B, unless means to minimize such an effect are taken. Thus, the metal-air battery can include motility means 300 for the heating element 150, to change the position of the heating element 150 and keep it positioned within the interface region 115 when the interface region 115 moves, as shown in FIG. 5C. In some implementations, the motility means 300 can include a servo motor, configured to move the heating element 150 in response to a change in position of the interface region 115. The motility means 300 can further include a motility sensor, configured to detect a parameter indicative of whether the heating element 150 is located in the interface region 115. For example, and considering that the metal anode 110 generally has significantly higher electric conductivity than does the passivation layer 120, a threshold range of electric conductivity can define the interface region, the threshold range of electric conductivity being intermediate between the electric conductivity of the metal anode 110 and the passivation layer 120. The motility sensor can measure the electric conductivity of the medium surrounding the heating element 150, and communicate that information to a motility controller. If the electric conductivity of the medium surrounding the heating element 150 is not within the threshold range, the controller can direct the servo motor to move the heating element 150 until the detected electric conductivity falls within the threshold range.

Also disclosed is a method of operating a metal-air battery. The method includes a step of providing a metal anode having a passivation layer on a surface of the metal anode, the passivation layer being formed of a metal-gas adduct and defining a reaction surface. The metal anode, passivation layer, and reaction surface of the method are as described above as relating to the metal-air battery 100. The method further includes a step of diffusing nucleophilic gas through a gas diffusion layer to the reaction surface. The gas diffusion layer is as described above, and the diffusing step is illustrated schematically in FIGS. 1 and 2.

The method further includes a step of permitting metal cations of the metal anode to react with electrons and the nucleophilic gas at the reaction surface to produce metal-gas adduct and thereby increase a size of the passivation layer. The step of permitting metal cations to react with electrons and nucleophilic gas is as described above with respect to Reaction III. The method also includes a step of monitoring a formation of voids at an interface region defining a boundary between the metal anode and the passivation layer. The interface region is as described above with respect to the metal-air battery 100. The monitoring step can optionally be performed with the monitoring device and the controller, as described above with respect to the metal-air battery 100.

The method can include a step of heating an interface region defining a boundary between the metal anode and the passivation layer, to at least partly melt material at the interface region, and thereby remove voids present at the interface region. The method can also include a steps of measuring the current in the external conductor during battery discharge and heating the interface when the measured current in the external conductor falls below a threshold.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A metal-air battery comprising:
    a metal anode;
        a passivation layer formed on the metal anode, comprising one or more gas adducts of an active metal that is contained in the metal anode, and having a reaction surface;
        an external conductor in electric communication with the metal anode; and
        a gas diffusion layer contacting the passivation layer, the gas diffusion layer comprising:
            a portion that is exposed to an external gas source; and
            a porous conductor in electric communication with the external conductor and contacting the reaction surface;
    wherein, during discharge, the metal anode undergoes oxidation such that cations of the active metal are conducted through the passivation layer to the reaction surface, reacting with nucleophilic gas received from the external gas source, and with electrons received from the porous conductor, producing additional metal-gas adduct that is incorporated to the passivation layer.

2. The metal-air battery as recited in claim 1, wherein the metal in the metal anode is selected from the group consisting of lithium, sodium, potassium, magnesium, aluminum, germanium, calcium, iron, silicon, tin, and zinc.

3. The metal-air battery as recited in claim 1, wherein the metal anode comprises graphite.

4. The metal-air battery as recited in claim 1, wherein the porous conductor comprises an array of carbon nanotubes having a surface area of at least 100 $m^2/g$.

5. The metal-air battery as recited in claim 1, wherein the passivation layer functions as both an electrolyte and cathode.

6. The metal-air battery as recited in claim 1, wherein the metal-air battery is free of volatile components.

7. The metal-air battery as recited in claim 1, further comprising a heating element positioned at an interface region between the metal anode and the passivation layer, configured to melt one or both of the metal anode and the passivation layer, and thereby eliminate voids therebetween.

8. The metal-air battery as recited in claim 7, wherein the heating element receives power from the metal-air battery.

9. The metal-air battery as recited in claim 8, comprising an ammeter configured to measure current in the external conductor.

10. The metal-air battery as recited in claim 9, comprising a controller in communication with the ammeter and the heating element, configured to activate the heating element when the current measured in the external conductor falls below a threshold.

11. A lithium-air battery free of volatile components, the battery comprising:
    a lithium anode;
    a passivation layer of an oxide of lithium formed on the lithium anode and defining a reaction surface, the passivation layer changing in size based on charge and discharge activity of the lithium-air battery;
    a gas diffusion layer comprising a porous conductor contacting the reaction surface;
    an interface region defining a boundary between the lithium anode and the passivation layer;

an external conductor in electric communication with the lithium anode and the porous conductor;

a monitoring device configured to detect a presence of voids adjacent the interface region; and a porous heating element disposed adjacent the interface region and configured to selectively heat the interface region and thereby eliminate the voids.

12. The lithium-air batter according to claim 11, wherein the monitoring device comprises an ammeter configured to detect a change in current passing through the external conductor.

13. The lithium-air battery according to claim 11, wherein the porous heating element comprises a mesh structure configured to melt a portion of one or both of the lithium anode and the passivation layer.

14. The lithium-air battery according to claim 11, wherein the porous heating element is configured to move in position if the interface region moves as a result of the change in size of the passivation layer.

15. A method of operating a metal-air battery, the method comprising:

providing a metal anode having a passivation layer on a surface of the metal anode, the passivation layer comprising one or more gas adducts of an active metal that is contained in the metal anode, the passivation layer further defining a reaction surface;

providing an external conductor in electric communication with the metal anode;

diffusing nucleophilic gas through a gas diffusion layer to the reaction surface;

the gas diffusion layer contacting the passivation layer, the gas diffusion layer comprising:

a portion that is exposed to an external gas source providing the nucleophilic gas; and a porous conductor in electric communication with the external conductor and contacting the reaction surface;

permitting metal cations of the metal anode to react with electrons and the nucleophilic gas at the reaction surface to produce additional gas adduct of the active metal and thereby increase a size of the passivation layer;

monitoring a formation of voids at an interface region defining a boundary between the metal anode and the passivation layer.

16. The method as recited in claim 1,
wherein the nucleophilic gas comprises oxygen.

17. The method as recited in claim 15, further comprising removing the voids formed at the interface region.

18. The method as recited in claim 17, comprising:
heating the interface region to melt a portion of the interface region and remove the voids.

19. The method as recited in claim 18, comprising heating the interface region by passing electric current through a semiconductor positioned in the interface region.

20. The method as recited in claim 18, further comprising:
measuring a current passing through the external conductor during battery discharge; and
heating the interface region when the current measured passing through the external conductor falls below a threshold value.

* * * * *